(12) United States Patent
Rajaraman et al.

(10) Patent No.: US 9,710,363 B2
(45) Date of Patent: Jul. 18, 2017

(54) DEPLOYMENT AND DEPLOYMENT PLANNING AS A SERVICE

(71) Applicant: International Business Machines Corporation, Armonk, NY (US)

(72) Inventors: Bala Rajaraman, Durham, NC (US); David B. Lindquist, Research Triangle Park, NC (US); Rekha D. Garapati, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/067,462

(22) Filed: Mar. 11, 2016

(65) Prior Publication Data

US 2016/0196202 A1 Jul. 7, 2016

Related U.S. Application Data

(63) Continuation of application No. 12/638,563, filed on Dec. 15, 2009, now Pat. No. 9,317,267.

(51) Int. Cl.
*G06F 9/44* (2006.01)
*G06F 11/36* (2006.01)
*G06F 9/445* (2006.01)

(52) U.S. Cl.
CPC ............ *G06F 11/3668* (2013.01); *G06F 8/61* (2013.01)

(58) Field of Classification Search
None
See application file for complete search history.

(56) References Cited

U.S. PATENT DOCUMENTS

| 5,432,932 | A | 7/1995 | Chen et al. |
| 7,073,164 | B1 | 7/2006 | Knowles |
| 7,146,536 | B2 | 12/2006 | Bingham et al. |
| 7,424,589 | B1 | 9/2008 | Pliss et al. |
| 7,478,361 | B2 | 1/2009 | Peteanu et al. |
| 7,490,073 | B1 | 2/2009 | Qureshi et al. |
| 7,552,036 | B2 | 6/2009 | Oslake et al. |
| 7,743,373 | B2 | 6/2010 | Avram et al. |
| 7,844,701 | B2 | 11/2010 | Ramany et al. |
| 8,090,744 | B1 | 1/2012 | Baird |
| 8,230,397 | B2 | 7/2012 | Farrell et al. |
| 8,352,535 | B2 | 1/2013 | Peled et al. |
| 8,677,348 | B1 | 3/2014 | Ramanathpura et al. |
| 2002/0169781 | A1 | 11/2002 | Poole et al. |

(Continued)

OTHER PUBLICATIONS

Belguidoum, Meriem et al., Analysis of deployment dependencies in software components, SAC '06, Apr. 23-27, 2006, Dijon, France.

(Continued)

*Primary Examiner* — Henry Tsai
*Assistant Examiner* — Christopher Bartels
(74) *Attorney, Agent, or Firm* — Jordan IP Law, LLC

(57) ABSTRACT

A system and method of deploying software provides for comparing a current software topology of a deployment site to a software deployment topology of an application, wherein the software deployment topology is required to deploy the application. One or more mismatches between the current software topology and the software deployment topology may be identified.

20 Claims, 2 Drawing Sheets

(56) References Cited

U.S. PATENT DOCUMENTS

| | | | |
|---|---|---|---|
| 2003/0037327 A1* | 2/2003 | Cicciarelli | G06F 8/61 717/178 |
| 2004/0111464 A1 | 6/2004 | Ho et al. | |
| 2004/0255048 A1 | 12/2004 | Lev Ran et al. | |
| 2005/0028143 A1* | 2/2005 | Aridor | G06F 8/71 717/122 |
| 2005/0125509 A1 | 6/2005 | Ramachandran | |
| 2005/0235054 A1 | 10/2005 | Kadashevich | |
| 2006/0190806 A1 | 8/2006 | Sasson et al. | |
| 2006/0255978 A1 | 11/2006 | Agarwala | |
| 2006/0259730 A1 | 11/2006 | Gimpl et al. | |
| 2007/0006327 A1 | 1/2007 | Lal et al. | |
| 2007/0011334 A1* | 1/2007 | Higgins | G06F 11/3604 709/227 |
| 2007/0136667 A1 | 6/2007 | Gerhart et al. | |
| 2007/0226320 A1 | 9/2007 | Hager et al. | |
| 2007/0226608 A1 | 9/2007 | Virk et al. | |
| 2008/0148225 A1 | 6/2008 | Sarkar et al. | |
| 2008/0250195 A1 | 10/2008 | Chow et al. | |
| 2008/0250276 A1 | 10/2008 | Martinez et al. | |
| 2008/0270973 A1 | 10/2008 | Edwards et al. | |
| 2008/0301637 A1 | 12/2008 | Stark | |
| 2009/0006071 A1 | 1/2009 | Dournov et al. | |
| 2009/0077229 A1 | 3/2009 | Ebbs | |
| 2009/0271763 A1 | 10/2009 | Varma et al. | |
| 2009/0282301 A1 | 11/2009 | Flynn et al. | |
| 2010/0005527 A1 | 1/2010 | Jeon | |
| 2010/0095297 A1 | 4/2010 | Sethi et al. | |
| 2010/0325264 A1 | 12/2010 | Crowder et al. | |
| 2011/0113070 A1 | 5/2011 | McCurdy et al. | |
| 2011/0161952 A1 | 6/2011 | Poddar et al. | |

OTHER PUBLICATIONS

Non-Final Office Action received for U.S. Appl. No. 12/638,563, mailed Dec. 20, 2012, 26 pages, U.S. Patent and Trademark Office.
Non-Final Office Action received for U.S. Appl. No. 12/638,563, mailed Jul. 23, 2013, 15 pages, U.S. Patent and Trademark Office.
Final Office Action received for U.S. Appl. No. 12/638,563, mailed Mar. 7, 2014, 15 pages, U.S. Patent and Trademark Office.
Advisory Action received for U.S. Appl. No. 12/638,563, mailed Jun. 10, 2014, 3 pages, U.S. Patent and Trademark Office.
Non-Final Office Action received for U.S. Appl. No. 12/638,563, mailed Dec. 31, 2014, 19 pages, U.S. Patent and Trademark Office.
Final Office Action received for U.S. Appl. No. 12/638,563, mailed Jul. 6, 2015, 24 pages, U.S Patent and Trademark Office.
Advisory Action received for U.S. Appl. No. 12/638,563, mailed Oct. 21, 2015, 4 pages, U.S. Patent and Trademark Office.
Notice of Allowance received for U.S. Appl. No. 12/638,563, mailed Dec. 16, 2015, 18 pages, U.S. Patent and Trademark Office.

* cited by examiner

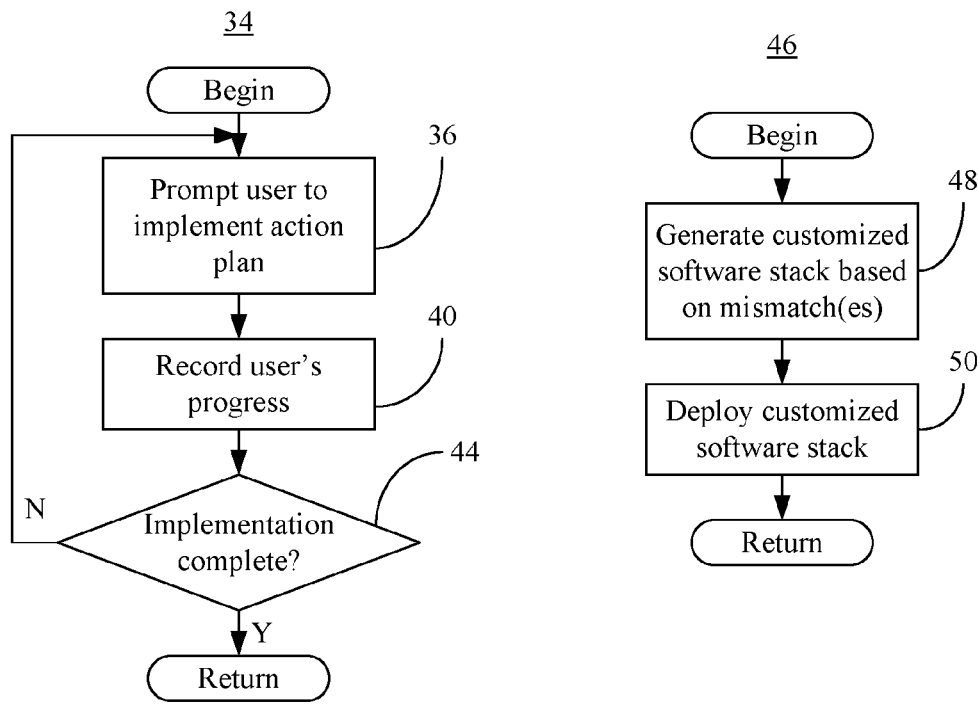
FIG. 3A
FIG. 3B
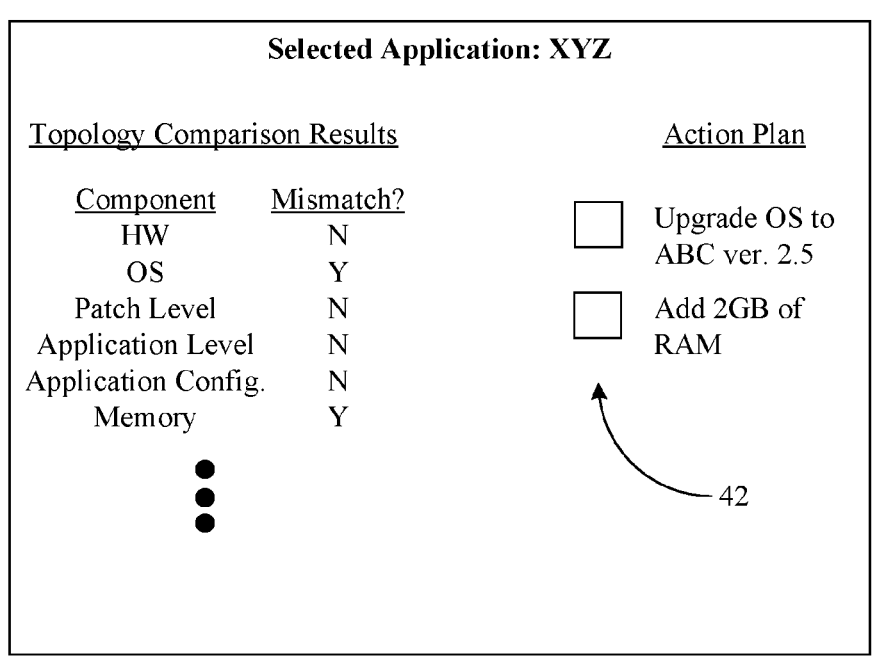
FIG. 4

DEPLOYMENT AND DEPLOYMENT PLANNING AS A SERVICE

CROSS-REFERENCE TO RELATED APPLICATIONS

The present application is a continuation of U.S. patent application Ser. No. 12/638,563 filed on Dec. 15, 2009.

BACKGROUND

Technical Field

Embodiments of the present invention generally relate to computing systems. More particularly, embodiments of the invention relate to an improved approach to deploying software to computing systems.

Discussion

In computing system and information technology (IT) environments, there is a growing need to reduce software deployment complexities. For example, software deployments may be increasingly dependent on hardware types, operating system, middleware and other applications. Software deployment may also involve complex configuration and integration for high availability and redundancy. In addition, the advent of Web 2.0 and dependence on third party providers for mashable software services may have created further challenges. Software deployments in this environment, for example, can become error prone, and time consuming. These challenges can impact an organization's ability to go to market quickly with new approaches, could increase labor costs and may reduce productivity. Moreover, customers typically do not have expertise in the deployment characteristics and requirements for complex applications. Indeed, they may often expect the software vendor to provide the deployment expertise in a simple and consumable form to the customer.

Most solutions to these challenges may typically address the creation of metadata and packages but do not address the skills gap that may exist. Some examples of software deployment being offered as a service in order to bridge the gap might include anti-virus updates, patch updates and updates to desktop products. These capabilities, however, may typically be limited to updates, which can require minimal knowledge of system and topology dependencies. Accordingly, there remains considerable room for improvement with regard to software deployment.

BRIEF SUMMARY

Embodiments may provide for a computer-implemented method in which a current software topology of a deployment site is compared to a software deployment topology, wherein the software deployment topology is required to deploy the application. The method may also provide for identifying a mismatch between the current software topology and the software deployment topology.

Embodiments can also provide for a computer-implemented method in which a current software topology of a deployment site is uploaded. A selection of a software application may be received and a software deployment topology required to deploy the application as a new software application may be determined. The method can also provide for comparing the current software topology to the software deployment topology. A mismatch between the current software topology and the software deployment topology may be determined, wherein the mismatch can include at least one of a hardware mismatch, an operating system (OS) mismatch, a patch level mismatch, an application level mismatch, an application configuration mismatch and a memory mismatch. The method may also provide for transmitting an action plan to a user via a graphical user interface based on the mismatch.

Embodiments may also provide for a computer program product having a computer readable medium and computer usable code stored on the computer readable medium, where, if executed by a processor, the computer usable code can cause a computer to upload a current software topology of a deployment site and receive a selection of a software application. A software deployment topology required to deploy the application as a new software installation may be determined. The current software topology can also be compared to the software deployment topology. In addition, the computer usable code may also cause a computer to identify a mismatch between the current software topology and the software deployment topology, wherein the mismatch may include at least one of a hardware mismatch, an OS mismatch, a patch level mismatch, an application level mismatch, an application configuration mismatch and a memory mismatch. The computer usable code may also cause a computer to transmit an action plan to a user via graphical user interface based on the mismatch.

Embodiments may also provide for resources satisfying a topology or a subset of the topology to be transferred temporarily from the customer to the provider for the purposes of deploying and configuring the software. Upon completion of the software deployment, the resources with the deployed software and configuration can be returned to the customer by the provider for completion of configuration and interconnection with other parts of the customer topology. Further, the temporary transfer of the resources can be accomplished using secure mechanisms to ensure separation of access between the customer and the provider including mechanisms such as staging VLANs (virtual local area networks).

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIGS. 3A and 3B are flowcharts of examples of implementing software deployment action plans according to embodiments; and FIG. 4 is an illustration of an example of a user interface according to an embodiment.

DETAILED DESCRIPTION

Figure 1:
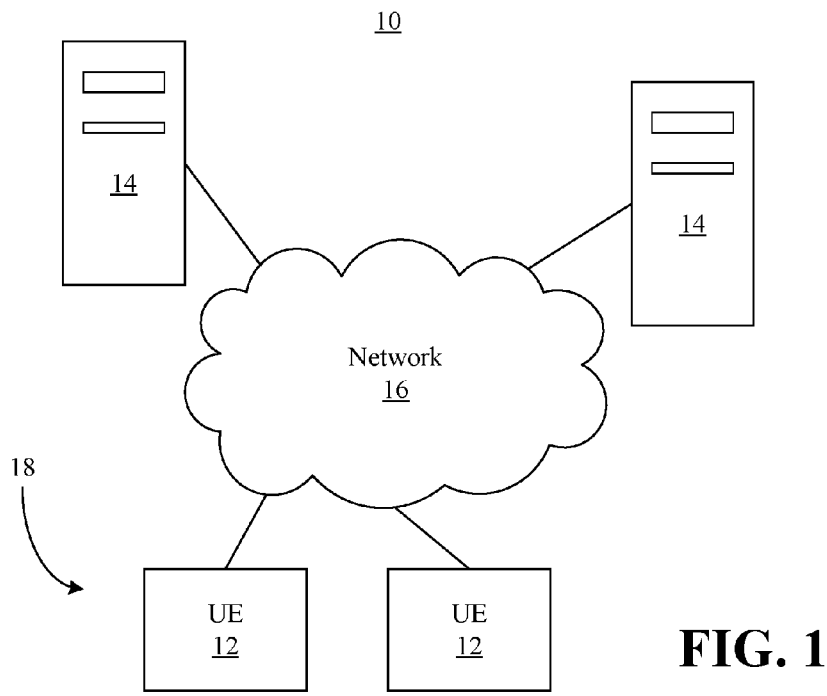
FIG. 1 is a block diagram of an example of a computing system architecture according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an architecture 10 is shown in which a software application may be deployed from one or more servers 14 to a deployment site 18 having one or more user equipment (UE) 80 devices. In the illustrated example, the UE 80, which can include web browsing capability, may be a personal computer (PC), notebook computer, personal digital assistant (PDA), wireless smartphone, or other device having access to the servers 14, via a network 16. The UE 80 connection to the network 16 may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. The UE 12 devices could be located in the same physical location or in different locations.

In addition, the network 16 can include any suitable combination of servers, access points, routers, base stations, mobile switching centers, public switching telephone network (PSTN) components, etc., to facilitate communication between the UE 12 and the servers 14. The servers 14 may be distributed and/or redundant web-based servers that are able to respond to web page requests for content. Thus, the servers 14 can have stored thereon hypertext markup language (HTML) and other markup language-encoded content, as well as databases and applications such as Java and other applications. The servers 14 could also be part of a cloud computing environment in which resources are shared across platforms in a complex fashion.

In one example, each server 14 constitutes a computer product having a computer readable medium with computer usable code stored on the computer readable medium, wherein, if executed by a processor, the computer usable code may cause the server 14 to implement a customized software deployment action plan.

Figure 2:
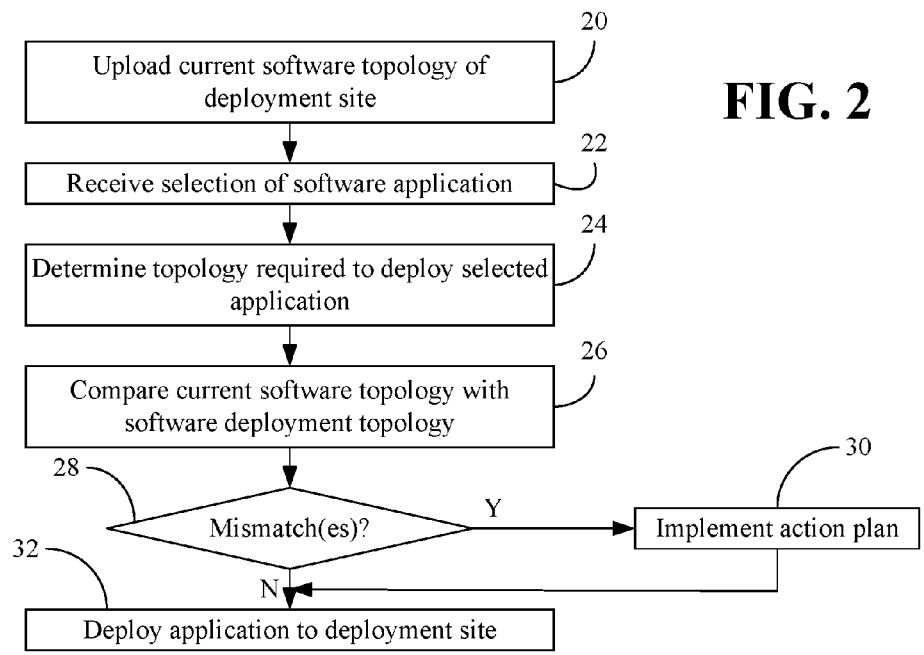
FIG. 2 is a flowchart of an example of a method of deploying software according to an embodiment.

In particular, FIG. 2 demonstrates that the current software topology of a deployment site may be uploaded at processing block 20. The current software topology could detail a wide variety of characteristics of the user equipment at the deployment site. Example characteristics include, but are not limited to, hardware, operating system (OS), patch levels, application levels, application configurations (e.g., thread size, heap dumps, etc.), memory, number of users, and so on. The current software topology might be defined in an extensible markup language (XML) file according to well documented techniques such as SDD (e.g., Solution Deployment Descriptor Specification 1.0, OASIS, Sep. 1, 2008), or other techniques. Block 22 provides for receiving a selection of a software application and block 24 provides for determining a software deployment topology required to deploy the selected application. The software deployment topology could also be defined in an XML file and may comply with SDD and/or other approaches. For example, the vendor (or a consultant/service provider acting as a proxy) may test the various applications with certain hardware and software prerequisites, and publish the XML describing the various supported topology layouts as a service on the web.

In one example, the application may be deployed as a new software installation rather than as a mere software update, which may require minimal knowledge of system and topology dependencies. Example applications include, but are not limited to, cloud computing applications, business-to-business applications, middleware, database applications, and so on. Moreover, installation of the selected application could involve many complex activities such as installing multiple levels of middleware, connecting to databases, configuring events, aggregating data, etc., where the software associated with each of these activities can have software topology requirements and/or dependencies.

The current software topology can be compared with the software deployment topology at block 26. If it is determined at block 28 that there are one or more mismatches between the current software topology and the software deployment topology, a customized deployment action plan may be implemented at block 30. Potential mismatches include, but are not limited to, hardware mismatches, OS mismatches, patch level mismatches, application level mismatches, application configuration (e.g., thread size, heap dumps, etc.) mismatches, memory mismatches, number of user mismatches, and so on. The action plan can therefore enable the user to address any potential deployment issues that may arise before deployment of the application is attempted. Thus, both the end user of the application and the vendor of the application can validate the various ways the software deployment could be a success or failure without going through extensive testing or trial and error methods. Indeed, the action plan could be developed and promoted as a pre-tested, pre-configured model and can be used to improve the consulting services offered by a given software vendor. Once any topology mismatches have been resolved, block 32 provides for deploying the selected application to the deployment site.

FIG. 3A shows one approach to implementing a deployment action plan in process 34. Thus, process 34 may be readily substituted for block 30 (FIG. 2), already discussed. In particular, illustrated block 36 provides for generating the action plan based on the topology mismatches and prompting a user to implement the action plan. FIG. 4 demonstrates that the topology comparison results may be transmitted/presented to the user via an intuitive graphical user interface (GUI) 38 along with the details of the particular deployment action plan. In the illustrated example, the system has identified an OS mismatch and a memory mismatch, and provides the user with a detailed checklist for implementing the plan. For example, the user might be instructed to upgrade the OS of the UE to ABC ver. 2.5 and add 2 GB of RAM before proceeding with the software deployment. Thus, once a user discovers potential issues with deploying the software into their environment, the user can begin to visually build the "to-be" state of the topology, by fixing the necessary problems (e.g., add more memory, drag and drop the correct level of software, fix configurations, etc.) until the deployment can be successful. With continuing reference to FIGS. 3A and 4, as the various components of the action plan are implemented, block 40 provides for recording the user's progress. For example, check boxes 42 could be displayed in order to track the user's progress. More advanced techniques, such as automatically creating a system snapshot, may also be used to drive and/or monitor the status of the action plan. If it is determined at block 44 that the implementation is not complete, the process 34 may repeat as appropriate.

Turning now to FIG. 3B, another approach to implementing the action plan is shown at process 46. Thus, process 46 may be readily substituted for block 30 (FIG. 2), already discussed. In particular, illustrated block 48 provides for generating a customized software stack based on the mismatch(es). The customized software stack may include virtualized system images as well as traditional software packages. Block 50 provides for deploying the customized software stack to the deployment site. For example, block 50 might be implemented in an automated fashion by enabling the user to temporarily transfer the UE of the deployment site to a separate shared virtual local area network (VLAN) and using automated technology such Tivoli Positioning Manager (TPM, IBM Corporation, Armonk, N.Y.) and a commercially available deployment planner to deploy the software. The same technologies might also be used to deploy the selected software application at block 32 (FIG. 2).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   comparing, by a server processing system, a current software topology detailing at least one characteristic of user equipment at a deployment site to a software deployment topology detailing at least one characteristic required to deploy an application;
   identifying, by the server processing system, a mismatch between the current software topology and the software deployment topology before deployment of the application is attempted at the deployment site, wherein the mismatch identifies a problem of the current software topology that is currently preventing the deployment of the application; and
   generating, by the server processing system, an action plan based on the mismatch, wherein the action plan resolves the mismatch between the current software topology and the software deployment topology by a change to an adequate characteristic needed to successfully deploy the application from a presently existing deficient and normally operating characteristic of the user equipment at the deployment site identified as the problem of the current software topology that prevents the successful deployment of the application if the change is not made in the user equipment.

2. The method of claim 1, further including:
   prompting, by the server processing system, a user to implement the action plan;
   recording, by the server processing system, the user's progress in implementing the action plan; and
   deploying, by the server processing system, the application to the deployment site if the user's progress indicates that implementation of the action plan is complete.

3. The method of claim 1, further including:
   generating, by the server processing system, a customized software stack based on the mismatch;
   deploying, by the server processing system, the customized software stack to the deployment site; and
   deploying, by the server processing system, the application to the deployment site.

4. The method of claim 1, further including transmitting, by the server processing system, the action plan to a user via a graphical user interface.

5. The method of claim 1, further including:
   identifying, by the server processing system, a plurality of mismatches between the current software topology and the software deployment topology; and
   generating, by the server processing system, the action plan based on the plurality of mismatches, wherein the action plan resolves the plurality of mismatches between the current software topology and the software deployment topology by a change to every adequate characteristic needed to successfully deploy the application from every presently existing deficient and normally operating characteristic of the user equipment at the deployment site identified as the problem of the current software topology.

6. The method of claim 1, further including receiving, by the server processing system, the current software topology from the deployment site.

7. A computer readable storage medium comprising instructions, where, if executed by a processor, causes a server to:
   compare a current software topology detailing at least one characteristic of user equipment at a deployment site to a software deployment topology detailing at least one characteristic required to deploy an application;
   identify a mismatch between the current software topology and the software deployment topology before deployment of the application is attempted at the deployment site, wherein the mismatch is to identify a problem of the current software topology that is currently preventing the deployment of the application; and
   generate an action plan based on the mismatch, wherein the action plan is to resolve the mismatch between the current software topology and the software deployment topology by a change to an adequate characteristic needed to successfully deploy the application from a presently existing deficient and normally operating characteristic of the user equipment at the deployment site identified as the problem of the current software topology that prevents the successful deployment of the application if the change is not to be made in the user equipment.

8. The computer readable storage medium of claim 7, comprising instructions, where, if executed by a processor, further causes the server to:
   prompt a user to implement the action plan;
   record the user's progress in implementing the action plan; and
   deploy the application to the deployment site if the user's progress indicates that implementation of the action plan is complete.

9. The computer readable storage medium of claim 7, comprising instructions, where, if executed by a processor, further causes the server to:
   generate a customized software stack based on the mismatch;
   deploy the customized software stack to the deployment site; and
   deploy the application to the deployment site.

10. The computer readable storage medium of claim 7, comprising instructions, where, if executed by a processor, further causes the server to transmit the action plan to a user via a graphical user interface.

11. The computer readable storage medium of claim 7, comprising instructions, where, if executed by a processor, further causes the server to:
    identify a plurality of mismatches between the current software topology and the software deployment topology; and
    generate the action plan based on the plurality of mismatches, wherein the action plan is to resolve the plurality of mismatches between the current software topology and the software deployment topology by a change to every adequate characteristic needed to successfully deploy the application from every presently existing deficient and normally operating characteristic of the user equipment at the deployment site identified as the problem of the current software topology.

12. The computer readable storage medium of claim 7, comprising instructions, where, if executed by a processor, further causes the server to receive the current software topology from the deployment site.

13. The computer readable storage medium of claim 7, wherein the current software topology and the software deployment topology are to be defined in extensible markup language (XML) files.

14. The computer readable storage medium of claim 7, wherein the software deployment topology is to be required to deploy the application as a new software installation.

15. An apparatus comprising a processor to:
compare a current software topology detailing at least one characteristic of user equipment at a deployment site to a software deployment topology detailing at least one characteristic required to deploy an application;
identify a mismatch between the current software topology and the software deployment topology before deployment of the application is attempted at the deployment site, wherein the mismatch is to identify a problem of the current software topology that is currently preventing the deployment of the application; and
generate an action plan based on the mismatch, wherein the action plan is to resolve the mismatch between the current software topology and the software deployment topology by a change to an adequate characteristic needed to successfully deploy the application from a presently existing deficient and normally operating characteristic of the user equipment at the deployment site identified as the problem of the current software topology that prevents the successful deployment of the application if the change is not to be made in the user equipment.

16. The apparatus of claim 15, wherein the processor is further to:
prompt a user to implement the action plan;
record the user's progress in implementing the action plan; and
deploy the application to the deployment site if the user's progress indicates that implementation of the action plan is complete.

17. The apparatus of claim 15, wherein the processor is further to:
generate a customized software stack based on the mismatch;
deploy the customized software stack to the deployment site; and
deploy the application to the deployment site.

18. The apparatus of claim 15, wherein the processor is further to transmit the action plan to a user via a graphical user interface.

19. The apparatus of claim 15, wherein the processor is further to:
identify a plurality of mismatches between the current software topology and the software deployment topology; and
generate the action plan based on the plurality of mismatches, wherein the action plan is to resolve the plurality of mismatches between the current software topology and the software deployment topology by a change to every adequate characteristic needed to successfully deploy the application from every presently existing deficient and normally operating characteristic of the user equipment at the deployment site identified as the problem of the current software topology.

20. The apparatus of claim 15, wherein the processor is further to receive the current software topology from the deployment site.

* * * * *